March 4, 1969 B. J. DOLAN ET AL 3,431,410
ORNAMENTAL DISPLAY
Filed July 13, 1966
FIG 1
FIG 3
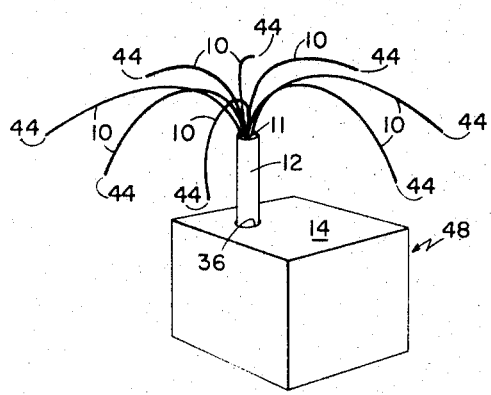
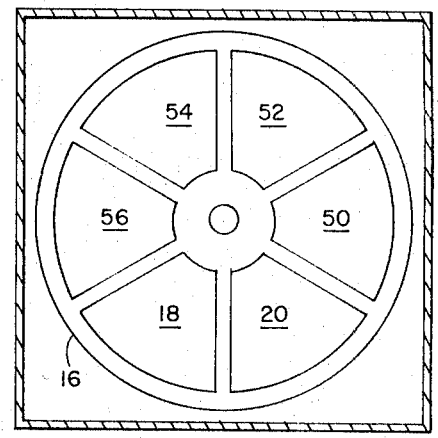
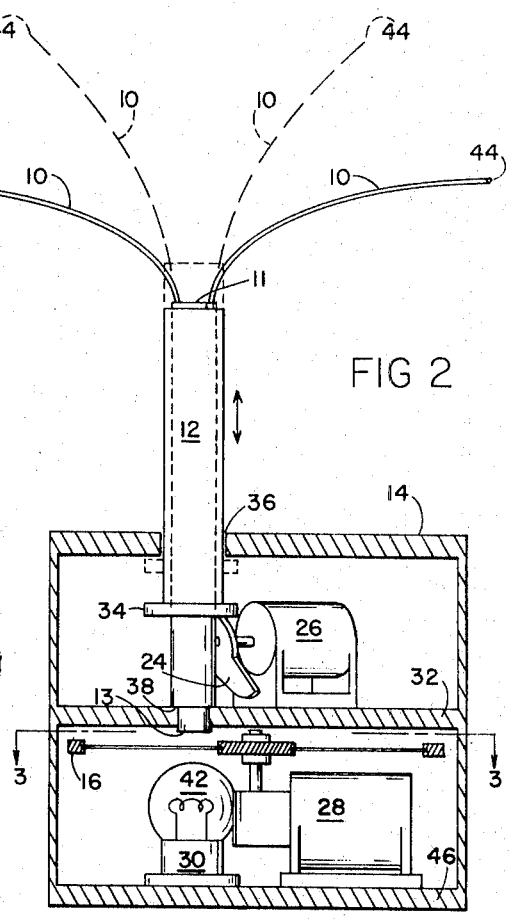
FIG 2
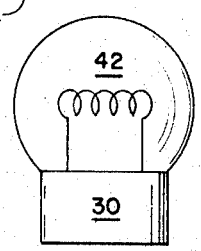
FIG 4

United States Patent Office 3,431,410
Patented Mar. 4, 1969

3,431,410
ORNAMENTAL DISPLAY
Bernard Joseph Dolan, Stoneham, and Robert Kempton Jenner, Hamilton, Mass., assignors to Donner Electronics, Inc., Melrose, Mass., a corporation of Massachusetts
Filed July 13, 1966, Ser. No. 564,881
U.S. Cl. 240—10.1
Int. Cl. F21p 3/00
3 Claims

ABSTRACT OF THE DISCLOSURE

A display having a multiplicity of fiber optic filaments held together along a length adjacent one end and transversely unrestrained at the other end. A light source is disposed opposite the first end of the fiber optic bundle and a rotatable color wheel is positioned between the light source and the fiber bundle. The filaments are flexible and have a diameter to length ratio such that the free ends fall away in random configurations to create pleasing light patterns when the filaments are caused to move.

---

This invention relates to ornamental displays with fiber optic filaments.

It is the primary object of this invention to provide a free form ornamental display with fiber optic filaments whose ends create illuminated sculptures. Another object of preferred embodiments of this invention is to provide means for altering the free form sculptures created by such filaments.

The invention features a multiplicity of fiber optic filaments tightly bound in a rigid support along a length adjacent to one end thereof and transversely unrestrained at the other end thereof. The individual filaments are flexible and have a diameter to length ratio such that the free ends fall away from the rigid support in random configurations. In a preferred embodiment there are provided a slide positioned against the bundle of filaments, a motor to cause longitudinal oscillation of the slide, a varicolored filter wheel and a motor to rotate the wheel.

Other objects, features, and advantages will appear from the following detailed description of a preferred embodiment thereof, taken together with the accompanying drawings in which:

FIG. 1 is a partially diagrammatic isometric view of a preferred embodiment of this invention;

FIG. 2 is a partially diagrammatic vertical cross-section, in which the dotted lines show changed positions of the slide and filaments;

FIG. 3 is a section at 3—3 of FIG. 2; and

FIG. 4 is a diagrammatic, fragmentary, enlarged view in which the dotted lines show changed positions of a filament and the slide.

In FIG. 1 of the drawings there is shown a bundle of glass fiber optic filaments 10 bound tightly together in a rigid support 11 along a length adjacent to filament ends 13, FIG. 2, and extending through aperture 36 in the cover 14 of the container indicated generally at 48. The ends 13 in FIG. 2 are mounted in an aperture 38 in transverse support 32 extending across and within the container indicated generally at 48.

The bundle of filaments 10 and support are partially enclosed in the movable slide 12. A motor or actuator 26 is provided to rotate cam 24 which engages collar 34 carried by slide 12 to provide longitudinal oscillation of slide 12. The ends 13 below support 32 are exposed, and a light source 42 in socket 30 is positioned axially below the bundle on the floor 46 of the container indicated generally at 48.

A color wheel 16 having a plurality of translucent varicolored filter portions 18, 20, 50, 52, 54, 56 (FIG. 3) is mounted between light source 42 and the ends 13 of filaments 10 exposed thereabove. A motor 28 mounted on the floor 46 of the container, indicated generally at 48, is provided to rotate color wheel 16.

The fiber optic filaments have a ratio of unrestrained length (above support 11) to diameter sufficiently great to permit the individual filaments to fall over in excess of 90° when the slide 12 is at its lowest position. In the presently preferred embodiment of the invention, there are approximately 6,000 individual filaments having a bundle diameter of approximately ¼ inch.

In operation, light source 42 radiates light to the bundle of filaments 10, which transmit light to ends 44, which glow as tiny spots of light. The pattern formed by the filaments 10 is varied by operation of cam 24 to oscillate longitudinally slide 12. The color of light transmitted is varied by operation of motor 28 to rotate color wheel 16.

Although not shown, other embodiments include a motor to rotate the bundle and a plurality of light sources. A fan could be provided to produce pattern variations and to cool the light source. A rheostat could be provided to vary light intensity. Other embodiments will occur to those skilled in the art and are within the scope of the following claims.

We claim:

1. An ornamental display comprising a multiplicity of flexible fiber optic filaments bound together in a rigid support along a length adjacent to a first corresponding end of each thereof to form a bundle and transversely unrestrained at second ends thereof, at least a portion of said filaments having a ratio of unrestrained length to diameter sufficiently great to permit said individual filaments to fall over in random configurations beyond said rigid support.

2. The ornamental display of claim 1 including a color wheel having a plurality of translucent varicolored panels placed between a light source and the bundle of filaments and a motor to rotate said color wheel.

3. The ornamental display of claim 1 which includes a slide mounted for longitudinal movement and partially enclosing said fiber optic filaments, and an actuator to drive said slide.

References Cited

UNITED STATES PATENTS

| | | | |
|---|---|---|---|
| 2,227,861 | 1/1941 | Petrone | 240—10.1 |
| 2,726,116 | 12/1955 | Barber | 240—10.1 XR |
| 3,310,681 | 3/1967 | Hargens | 88—1 XR |

NORTON ANSHER, Primary Examiner.

RICHARD L. MOSES, Assistant Examiner.

U.S. Cl. X.R.

240—1, 10; 350—96